United States Patent [19]

Fuhr et al.

[11] Patent Number: 5,272,193

[45] Date of Patent: Dec. 21, 1993

[54] THERMOPLASTIC POLYCARBONATE MOULDING COMPOUNDS WITH FLAME-RESISTANT PROPERTIES

[75] Inventors: Karl Fuhr, Krefeld; Friedemann Müller, Neuss; Karl-Heinz Ott, Leverkusen, all of Fed. Rep. of Germany

[73] Assignee: Bayer Aktiengesellschaft, Leverkusen, Fed. Rep. of Germany

[21] Appl. No.: 905,519

[22] Filed: Jun. 29, 1992

[30] Foreign Application Priority Data

Jul. 12, 1991 [DE] Fed. Rep. of Germany ....... 4123041

[51] Int. Cl.$^5$ ................... C08K 5/523; C08K 5/5313; C08L 69/00
[52] U.S. Cl. .................................. 524/140; 524/126; 524/141; 524/142; 525/67; 525/104
[58] Field of Search ................ 524/140, 126, 141

[56] References Cited

U.S. PATENT DOCUMENTS

| | | | |
|---|---|---|---|
| 4,692,488 | 9/1987 | Kress et al. | 524/140 |
| 4,704,417 | 11/1987 | Bonin et al. | 524/140 |
| 4,751,260 | 6/1988 | Kress et al. | 524/130 |
| 4,788,238 | 11/1988 | Tödtemann et al. | 524/130 |
| 4,883,835 | 11/1989 | Buysch et al. | 524/140 |
| 4,925,891 | 5/1990 | Kress et al. | 524/139 |
| 4,983,658 | 1/1991 | Kress et al. | 524/141 |
| 4,988,748 | 1/1991 | Fuhr et al. | 524/141 |
| 5,021,488 | 6/1991 | Fuhr et al. | 524/126 |
| 5,061,745 | 10/1991 | Wittmann et al. | 524/140 |
| 5,100,958 | 3/1992 | Fuhr et al. | 525/66 |
| 5,102,931 | 4/1992 | Fuhr et al. | 524/126 |

FOREIGN PATENT DOCUMENTS

| | | |
|---|---|---|
| 0019126 | 11/1980 | European Pat. Off. |
| 0184714 | 6/1986 | European Pat. Off. |
| 0245683 | 11/1987 | European Pat. Off. |
| 0272441 | 6/1988 | European Pat. Off. |
| 0332965 | 9/1989 | European Pat. Off. |
| 0351648 | 1/1990 | European Pat. Off. |
| 3429481 | 2/1986 | Fed. Rep. of Germany . |
| 3430234 | 2/1986 | Fed. Rep. of Germany . |
| 3516807 | 11/1986 | Fed. Rep. of Germany ...... 524/140 |
| 3523316 | 1/1987 | Fed. Rep. of Germany . |
| 3545609 | 6/1987 | Fed. Rep. of Germany . |
| 3617511 | 11/1987 | Fed. Rep. of Germany . |
| 3629546 | 3/1988 | Fed. Rep. of Germany . |

*Primary Examiner*—Paul R. Michl
*Assistant Examiner*—Olga Asinovsky
*Attorney, Agent, or Firm*—Connolly & Hutz

[57] ABSTRACT

Thermoplastic polycarbonate moulding compounds containing 40 to 90 parts by weight of a thermoplastic aromatic polycarbonate; 0 to 80 parts by weight of a copolymer or polycondensate consisting of 0 to 50 parts by weight of a thermoplastic copolymer of 50 to 95% by weight of styrene, α-methylstyrene, styrene alkylated in the nucleus, halogenated styrene or mixtures thereof and 5 to 50% by weight of acrylonitrile, methacrylonitrile, alkyl acrylate, alkyl methacrylate, maleic acid anhydride, N-substituted maleiimide, vinyl acetate or mixtures thereof and/or 0 to 80 parts by weight of a thermoplastic polyalkylene terephthalate; 1 to 25 parts by weight of graft polymer prepared from 5 to 90 parts by weight of a mixture of: 50 to 95% by weight of styrene, α-methylstyrene, halogenated styrene, styrene alkylated in the nucleus, methyl methacrylate or mixtures thereof and 5 to 50% by weight of (meth)acrylonitrile, methyl methacrylate, maleic acid anhydride, N-substituted maleiimide or mixtures thereof on 10 to 95 parts by weight of a rubber having a glass temperature TG of ≦10° C.; 1 to 30 parts by weight of phosphoric acid esters of phenols, bisphenols and/or polyphenols; and 0.05 to 5 parts by weight of anti-dripping agent, the total weight of the above amounting to 100 parts by weight, wherein the anti-dripping agent is aromatic polyamides or polyimidamides (aramides) in the form of fibres or powders or deposited on carriers.

15 Claims, No Drawings

THERMOPLASTIC POLYCARBONATE MOULDING COMPOUNDS WITH FLAME-RESISTANT PROPERTIES

The present invention relates to thermoplastic moulding compounds containing

A) from 40 to 90 parts by weight, preferably from 50 to 70 parts by weight, of a thermoplastic aromatic polycarbonate, B) from 0 to 80 parts by weight of a copolymer or polycondensate consisting of B.1) from 0 to 50 parts by weight, preferably from 0 to 35 parts by weight, in particular from 1 to 10 parts by weight of a thermoplastic copolymer of 50 to 95% by weight of styrene, o-methylstyrene, styrene alkylated in the nucleus, halogenated styrene or mixtures thereof and from 5 to 50% by weight of acrylonitrile, methacrylonitrile, alkyl acrylate, alkyl methacrylate, maleic acid anhydride, N-substituted maleiimide, vinyl acetate or mixtures thereof and/or B.2) from 0 to 80 parts by weight, preferably from 0 to 60 parts by weight, in particular from 0 to 10 parts by weight of a thermoplastic polyalkylene terephthalate, C) from 1 to 25 parts by weight, preferably from 5 to 20 parts by weight of a graft polymer prepared from C.1) 5 to 90 parts by weight, preferably 30 to 80 parts by weight of a mixture of:

C.1.1) from 50 to 95% by weight of styrene, α-methylstyrene, halogenated styrene, styrene alkylated in the nucleus, methyl methacrylate or mixtures thereof and C.1.2) from 5 to 50% by weight of (meth)acrylonitrile, methyl methacrylate, maleic acid anhydride, N-substituted maleiimide or mixtures thereof on C.2) from 10 to 95 parts by weight, preferably from 20 to 70 parts by weight of a rubber have a glass temperature TG of $\leq 10°$ C., D) from 1 to 30 parts by weight, preferably from 2 to 20 parts by weight, in particular from 5 to 18 parts by weight of phosphoric acid esters of phenols, bisphenols and/or polyphenols, and E) from 0.05 to 5 parts by weight of anti-dripping agent, in which the total weight of A+B+C+D+E should amount to 100 parts by weight, characterised in that they contain, as anti-dripping agent, from 0.05 to 5 parts by weight, preferably from 0.5 to 3 parts by weight, of aromatic polyamides and/or polyimidamides in the form of (ground) fibres or (finely divided) powders or deposited on carriers.

The aromatic polyamides/polyimidamides consist predominantly, i.e. to an extent of more than 50% by weight, preferably 85% by weight, of aromatic dicarboxylic acids and aromatic diamines. They may be used as finely divided fibres and/or powders or deposited on carriers. Aromatic polyamides/polyimidamides are those known as aramides. The aromatic polyamide/polyimidimides may be prepared by known processes, e.g. by the condensation of (activated) acid derivatives with diamines or by methods of interface condensation.

The addition of aromatic amides/polyimidamides to the moulding compounds according to the invention prevents the compounds from dripping when burning in the event of fire. Thus when aromatic polyamides/polyimidamides are used in combination with the phosphorus compounds D), self-extinction is achieved without dripping according to the test of UL-94, with the assessment V-O in test samples 1.6 mm in thickness.

It is known to impart anti-dripping properties to moulding compounds of thermoplastic aromatic polycarbonates, thermoplastic copolymers and graft polymers and aromatic esters of phosphoric acid and phosphonic acids by means of tetrafluoroethylene polymers (see DE-OS 3 429 481; DE-OS 3 430 234; U.S. Pat. No. 4,983,658; U.S. Pat. No. 4,788,238; DE-OS 3 444 869 (EP 184 714); U.S. Pat. No. 4,751,260; DE-OS 3 521 888; DE-OS 3 523 316; U.S. Pat. No. 4,692,488; DE-OS 3 545 609; DE-OS 3 615 768 (EP 245 683); DE-OS 3 617 511; U.S. Pat. No. 4,925,891; DE-OS 3 629 546; U.S. Pat. No. 4,988,748; U.S. Pat. No. 5,021,488). Aromatic polyamides/polyimidamides, however, are not mentioned as anti-dripping agents. The disadvantages of tetrafluoroethylene polymers lie in their halogen content and the resulting severe deformation of the test samples in the event of fire (e.g. UL 94 test of flame exposure).

Particulate silicone rubbers are described as anti-dripping agents in EP-A 272 441 and U.S. Pat. No. 5,100,958, inter alia for moulding compounds of thermoplastic aromatic polycarbonates, graft polymers and optionally thermoplastic copolymers and thermoplastic polyalkylene terephthalates. Aromatic polyamides/polyimidamides are not mentioned as anti-dripping agents. Silicone rubbers are less effective as anti-dripping agents than polytetrafluoroethylene polymers.

Aromatic polyamides/polyimidamides are described as anti-dripping agents for aliphatic polyamide moulding compounds in EP-A 332 965, U.S. Pat. No. 5,102,931 and U.S. Pat. No. 5,021,480. Their capacity to function as anti-dripping agent was regarded as substrate specific on account of their chemical structure. It was not to be expected that they could also be effective in other moulding compounds.

It was surprisingly found that the addition of from 0.05 to 5% by weight, preferably from 0.5 to 3% by weight of aromatic polyamides/polyimidamide (aramides) in the form of fibres or powders or deposited on organic or inorganic carriers in combination with the addition of aromatic esters of phosphoric acid to moulding compounds of aromatic thermoplastic polycarbonates, graft polymers and optionally thermoplastic copolymers and thermoplastic polyalkylene terephthalates eliminates the formation of burning drips from these moulding compounds, and the deformation of the test samples which normally occurs in the event of fire does not occur when tetrafluoroethylene polymers are used. The aromatic polyamides/polyimidamides according to the invention used as anti-dripping agents moreover provide the possibility of obtaining completely halogen-free moulding compounds which are non-dripping and self-extinguishing in the event of fire.

For obtaining this antidripping effect, it is suitable to use aromatic polyamides/polyimidamides according to the invention consisting predominantly, i.e. to an extent of more than 50% by weight, of aromatic dicarboxylic acids and aromatic diamines. They may be used as fibres obtained from the usual technical processes of their production, as ground fibres, as (finely divided) powders or as aromatic polyamides/polyimidamides deposited on carriers. Aromatic polyamides/polyimidamides having molecular weight of from 2000 to above 50,000 (number average) are particularly suitable.

Examples of aromatic polyamides/polyimidamides according to the invention include those defined as fibre materials by Kirk-Othmer in Encyclopedia of Chemical Technology, Third Edition, Volume 3, pages 213 et seq, in which their chemical structures are also described.

Polyamides/polyimidamides obtained as powders, e.g. from their synthesis by the interface polycondensation process, may also be used according to the invention. The molecular weights (number average) of these products may be from below 50,000 to 2000. Their preferred particle size is from 5 to 20 μm.

Polyamides/polyimidamides which are also particularly suitable for the purpose of this invention are those which are synthesized by the interface process or by the solution process in the presence of fillers which have a high specific surface area or finely divided graft polymers and are preferably deposited on the surface of the carrier material.

The aromatic polyamides/polyimidamides may also contain a proportion amounting to less than 50% by weight of the total quantity of aliphatic dicarboxylic acids and diamines of the type used for the synthesis of industrially known polyamides (see Ullmann's Encyclopädie der technischen Chemie, 4th Edition, Volume 19, page 39 et seq).

The aromatic polyamides/polyimidamides suitable for use as anti-dripping agents according to the invention are normally prepared from aromatic arylene dicarboxylic acids and aromatic diamines by solution condensation or interface condensation. Examples of arylene dicarboxylic acids include in particular phthalic acid, isophthalic acid and terephthalic acid. Examples of suitable aromatic diamines include o-phenylenediamine, m-phenylenediamine, p-phenylenediamine and diaminodiphenyls in which the phenyl units are attached by hetero atoms or groups, corresponding to formula (I)

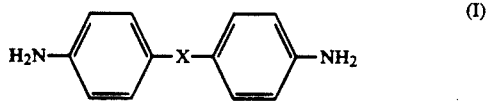

(I)

wherein X=O, S, SO$_2$, CO, CH$_2$, C(CH$_3$)$_2$ or CF$_2$.

Polyimidamides corresponding to formula (II)

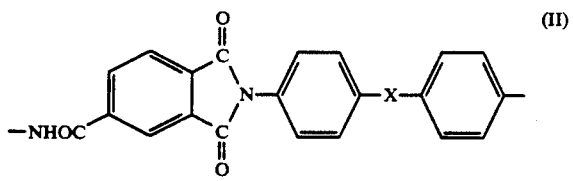

(II)

in which X=CH$_2$ or O are also suitable.

Aramides containing a heterocyclene structure in the main chain, such as oxidazole, triazole, bis-thiazole, benzimidazole, hydantoin or quinazolone structures, are also suitable for the invention (see Ullmann's Encyclopä- die der technischen Chemie, 4th Edition, Volume 11, pages 345 to 350). These aramides may be synthesized from corresponding dicarboxylic acids, diamines or aminocarboxylic acids.

Aromatic polyamides/polyimidamides suitable for the invention also include those consisting to an extent of over 50% by total weight of the above-mentioned aromatic polyamides/polyimidamides, the remainder consisting of (cyclo)aliphatic carboxylic acids and/or (cyclo)aliphatic diamines. Examples of suitable aliphatic dicarboxylic acids include adipic acid, 2,2,4- and 2,4,4-trimethyladipic acid, azelaic acid, sebacic acid, decane dicarboxylic acid and dodecanedicarboxylic acid. The aliphatic diamines used may be, for example, hexamethylenediamine, 2,2,4- and 2,4,4-trimethylhexamethylenediamine, diamino-dicyclohexyl-propane isomers, isophorone diamines and xylylene diamines.

The polycarbonates suitable for use as component A) according to the invention may be either homopolymers or copolycarbonates of the diphenols corresponding to formula (III)

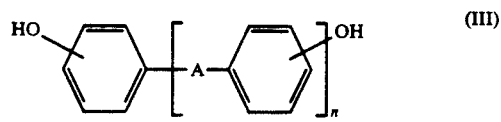

(III)

wherein n stands for 1 or zero and A has the meaning indicated for formula (IIIa).

The polycarbonates of component A) may in particular also be copolycarbonates of diphenols (III) and (IIIa)

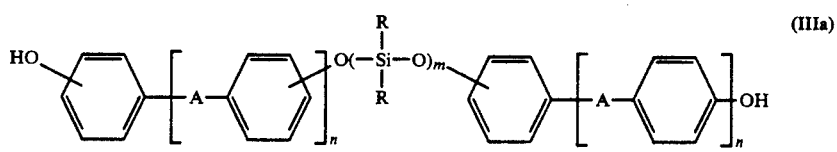

(IIIa)

wherein A denote a single bond, C$_1$-C$_5$-alkylene, C$_2$-C$_5$-alkylidene, a C$_5$-C$_6$-cycloalkylidene, O, S, or SO$_2$; the aromatic regions may be substituted by methyl groups or halogen atoms; n=1 or zero; the R's may be identical or different and denote a straight chain C$_1$-C$_{20}$-alkyl or a branched chain C$_3$-C$_{20}$-alkyl or C$_6$-C$_{20}$-aryl such as phenyl-C$_1$-C$_{10}$-alkyl and m denotes a number from 5 to 100, preferably from 20 to 80, and the proportion by weight of diphenols of Formula (IIIa) used in the copolycarbonates is calculated so that the proportion of diorganosiloxy units (IV)

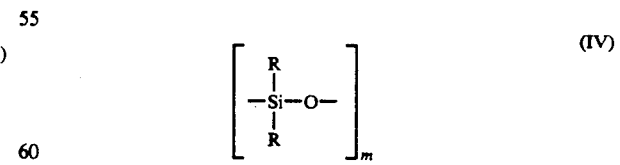

(IV)

in polycarbonate A) is from 1 to 25% by weight, preferably from 2.5 to 25% by weight.

The polycarbonates used as Component A) may be either linear or branched and they may contain aromatically bound halogen, preferably bromine and/or chlorine, or they may be free from aromatically bound halogen, in other words halogen-free.

The polycarbonates may be used as Component A) either singly or as mixtures. When Component A) is a mixture of siloxane-containing polycarbonates with siloxane-free polycarbonates, the siloxane-containing polycarbonates may contain more than 25% by weight of diorganosiloxy units, provided the siloxane-free polycarbonates present reduce the total proportion of diorganosiloxy units in the polycarbonate mixture to a value of from to 25% by weight.

The diphenols of Formula (III) are either known from the literature or may be prepared by processes known from the literature. Polydiorganosiloxanes having hydroxyaryloxy end groups as shown in Formula (IIIa) are also known (see e.g. U.S. Pat. No. 3,419,634) or may be prepared by processes known from the literature.

The preparation of the polycarbonates suitable for use as component A) according to the invention is known from the literature and may be carried out e.g. with phosgene by the phase interface process or with phosgene by the homogeneous phase process (the so-called pyridine process), the required molecular weight being adjusted in known manner by using the appropriate quantity of known chain terminators. The preparation of polydiorganosiloxane-containing polycarbonates is described e.g. in DE-OS 3 334 782.

Examples of suitable chain terminators include phenol and p-tert.-butylphenol and long chain alkylphenols such as 4-(1,3-tetramethyl-butyl)phenol according to DE-OS 2 842 005 and monoalkylphenols and dialkylphenols having a total of 8 to 20 carbon atoms in the alkyl substituents according to DE-OS 3 506 472, e.g. p-nonylphenol, 2,5-di-tert.-butylphenol, p-tert.-octylphenol, p-dodecylphenol, 2-(3,5-dimethylheptyl)-phenol and 4-(3,5-dimethylheptyl)-phenol. The quantity of chain terminators to be used is generally from 0.5 to 10 mol-%, based on the sum of the diphenols (III) and (IIIa) used.

The polycarbonates suitable as component A) according to the invention may be branched in known manner, preferably by the incorporation of from 0.05 to 2.0 mol-%, based on the sum of diphenols, of trifunctional or higher than trifunctional compounds, e.g. compounds having three or more than three phenolic OH groups.

They have average weight average molecular weights ($M_w$, determined e.g. by ultracentrifugation or scattered light measurement) of from 10,000 to 200,000, preferably from 20,000 to 80,000.

The following are examples of suitable diphenols corresponding to Formula (III): Hydroquinone, resorcinol, 4,4'-dihydroxydiphenyl, 2,2-bis-(4-hydroxyphenyl)-propane, 2,4-bis-(4-hydroxyphenyl)-2-methylbutane, 2,2-bis-(4-hydroxy-3,5-dimethylphenyl)-propane, 2,2-bis-(4-hydroxy-3,5-dichlorophenyl)-propane, 2,2-bis-(4-hydroxy-3,5-dibromophenyl)-propane, 1,1-bis-(4-hydroxyphenyl)-cyclohexane and 1,1-bis-(4-hydroxyphenyl)-3,3,5-trimethylcyclohexane.

2,2-Bis-(4-hydroxyphenyl)-propane and 1,1-bis-(4-hydroxyphenyl)-cyclohexane are preferred diphenols corresponding to Formula (III). Mixtures of diphenols may also be used.

Suitable diphenols of Formula (IIIa) are those in which R stands for methyl, ethyl, propyl, n-butyl, tert.-butyl or phenyl, in particular methyl. Mixtures of diphenols corresponding to Formula (IIIa) may also be used.

Preferred diphenols corresponding to Formula (IIIa) include those corresponding to Formula (IIIb)

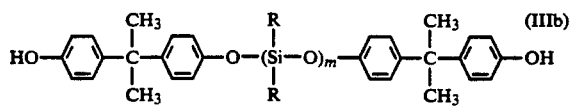

wherein the R's are identical and have the meanings indicated above and m stands for an integer having a value from 5 to 100, preferably from 20 to 80.

Copolycarbonates of diphenols of Formula (III) with diphenols of Formula (IIIb) are preferred polydiorganosiloxane/polycarbonate block copolymers.

Thermoplastic copolymers suitable for use as component B1) according to the invention are resinous, thermoplastic and free from rubber. Particularly preferred polymers are those of styrene, α-methylstyrene, styrene alkylated in the nucleus, halogenated styrene and mixtures thereof with acrylonitrile, methacrylonitrile, alkylacrylate, alkylmethacrylate, maleic acid anhydride, N-substituted maleiimide, vinyl acetate or mixtures thereof. Styrenes substituted in the nucleus are understood to be styrenes alkylated in the nucleus, e.g. p-methylstyrene.

Particularly preferred ratios by weight in the thermoplastic polymer are e.g. from 60 to 80% by weight of styrene, α-methylstyrene, styrene substituted in the nucleus, halogenated styrene or mixtures thereof and from 20 to 40% by weight of acrylonitrile.

The polymers used as component B1) are known and may be prepared by emulsion, suspension, solution or solvent-free polymerisation. The polymers preferably have molecular weights $M_w$ (weight average determined by light scattering or sedimentation) of from 15,000 to 200,000.

The polyalkylene terephthalates used as component B2) are reaction products of aromatic dicarboxylic acids or their reactive derivatives such as dimethylesters or anhydrides and aliphatic, cycloaliphatic or araliphatic diols and mixtures of these reaction products.

Preferred polyalkylene terephthalates contain at least 80% by weight, preferably at least 90% by weight, based on the dicarboxylic acid component, of terephthalic acid groups and at least 80 mol-%, preferably at least 90 mol-%, based on the diol component, of ethylene glycol and/or butane-1,4-diol groups.

The preferred polyalkylene terephthalates may, in addition to containing terephthalic acid groups, contain up to 20 mol-%, preferably up to 10 mol-%, of residues of other aromatic or cycloaliphatic dicarboxylic acids having 8 to 14 carbon atoms or aliphatic dicarboxylic acids having 4 to 12 carbon atoms, e.g. residues of phthalic acid, isophthalic acid, naphthalene-2,6-dicarboxylic acid, 4,4'-diphenyl-dicarboxylic acid, succinic acid, adipic acid, sebacic acid, azelaic acid or cyclohexane diacetic acid.

The preferred polyalkylene terephthalates may also in addition to containing ethylene glycol or butane-1,4-diol groups contain up to 20 mol-%, preferably up to 10 mol-%, of other aliphatic diols having 3 to 12 carbon atoms or cycloaliphatic diols having 6 to 21 carbon atoms, e.g. residues of propane-1,3-diol, 2-ethylpropane-1,3-diol, neopentyl glycol, pentane-1,5-diol, hexane-1,6-diol, cyclohexane-1,4-dimethanol, 3-ethylpentane-2,4-diol, 2-methylpentane-2,4-diol, 2,2,4-trimethylpentane-1,3- and-1,6-diol, 2-ethylhexane-1,3-diol, 2,2-diethylpropane-1,3-diol, hexane-2,5-diol, 1,4-di-(β-hydroxyethoxy)-benzene, 2,2-bis-(4-hydroxycyclohexyl)-propane, 2,4-dihydroxy-1,1,3,3-tetramethylcyclobutane, 2,2-bis-(3-β-hydroxyethoxyphenyl)-propane and 2,2-bis-(4-hydroxypropoxyphenyl)-propane (DE-OS 2 407 674, 2 407 776 and 27 15 932).

The polyalkylene terephthalates may be branched by the incorporation of relatively small quantities of trihydric or tetrahydric alcohols or tribasic or tetrabasic carboxylic acids, e.g. according to DE-OS 1 900 270 and U.S. Pat. No. 3 692 744. Examples of preferred branching agents include trimesic acid, trimellitic acid, trimethylolethane and -propane and pentaerythritol.

Polyalkylene terephthalates prepared entirely from terephthalic acid and their reactive derivatives (e.g. their dialkylesters) and ethylene glycol and/or butane-1,4-diol and mixtures of these polyalkylene terephthalates are particularly preferred.

Preferred polyalkylene terephthalate mixtures contain from 1 to 50% by weight, preferably from 1 to 30% by weight of polyethylene terephthalate and from 50 to 99% by weight, preferably from 70 to 99% by weight of polybutylene terephthalate.

The preferred polyalkylene terephthalates generally have an intrinsic viscosity of from 0.4 to 1.5 dl/g, preferably from 0.5 to 1.3 dl/g, in particular from 0.6 to 1.2 dl/g, determined in phenol/o-dichlorobenzene (1:1 parts by weight) at 25° C. in an Ubbelohde viscosimeter.

The polyalkylene terephthalates may be prepared by known methods (see e.g. Kunststoff-Handbuch, Volume VIII, pages 695 et seq, Carl Hanser Verlag, Munich, 1973).

Rubbers suitable for the preparation of the graft polymers used as component C) include in particular polybutadienes, polychloroprenes, polyisoprenes, styrene/butadiene copolymer rubbers, acrylonitrile/butadiene copolymer rubbers having gel contents (determined at 20° C.) above 30% by weight, acrylate rubbers, EPDM (ethylene-propylenediene-monomer) rubbers and silicone rubbers. Suitable butadiene/styrene copolymer rubbers may contain up to 30% by weight, based on the weight of the rubber, of a lower alkyl ester of acrylic or methacrylic acid (for example, methyl methacrylate, ethyl acrylate or methyl acrylate).

Suitable alkyl acrylate rubbers include those based on $C_1$-$C_8$-alkyl acrylates, in particular ethyl, butyl and ethylhexyl acrylate. These alkyl acrylate rubbers may contain up to 30% by weight, based on the weight of the rubber, of monomers such as vinyl acetate, acrylonitrile, styrene, styrene alkylated in the nucleus, halogenated styrene, methyl methacrylate and/or vinyl ethers incorporated by copolymerisation. These alkyl acrylate rubbers may also contain minor quantities, preferably up to 5% by weight, based on the weight of the rubber, of ethylenically unsaturated monomers which have a cross-linking action. Examples of such cross-linking agents include alkylenediol-di(meth)acrylates, polyester-di(meth)acrylates, divinylbenzene, trivinylbenzene, triallylcyanurate, allyl(meth)acrylate, butadiene and isoprene. Such alkyl acrylates are known. Acrylate rubbers used as graft basis may also be products containing a cross-linked diene rubber of one or more conjugated dienes such as polybutadiene or a copolymer of a conjugated diene with an ethylenically unsaturated monomer such as styrene and/or acrylonitrile as nucleus.

Silicone rubbers suitable for this invention contain, in a dispersed form, at least partially cross-linked, particulate silicone rubbers containing groups corresponding to the following general formulae mainly in a chemically incorporated form:

a) $R_2SiO_{2/2}$, $RSiO_{3/2}$, $R_2R^3SiO_{1/2}$, $SiO_{4/2}$ and optionally groups of the following formula:

b) $R^1CH\!=\!CH\!-\!(R^2)$, optionally in combination with SH groups, wherein

R = a monovalent, saturated hydrocarbon group, in particular $CH_3$ or $C_6H_5$ optionally substituted by SH, halogen or $C_1$-$C_6$-alkoxy, $R^1$ = H or $C_1$-$C_6$-alkyl, in particular H or $CH_3$, $R^2$ = a single bond, $C_1$-$C_4$-alkylene, in particular $CH_2$ or $C_2H_4$, and $R^3$ = R or OH.

The quantities of the individual siloxane units are calculated to provide from 0 to 0.5 molar units of $R_2R^3SiO_{\frac{1}{2}}$, from 0 to 10 molar units of the formula $RSiO_{3/2}$ and from 0 to 3 molar units of the formula $SiO_{4/2}$ for every 100 molar units of the formula $R_2SiO_{2/2}$. In preferred silicone rubbers, at least 80% of all the groups denoted by R are $CH_3$ groups.

In the group $R_2R^3SiO_{\frac{1}{2}}$, one of the three groups denoted by R may be a hydroxyl group. The dimethylhydroxysiloxy unit is a particularly preferred end group.

The silicone rubbers contain groups b) in quantities of from 2 to 10 mol-%, based on the total of all the groups denoted by R.

Diene rubbers, alkylacrylate rubbers and silicone rubbers are preferred rubbers for the preparation of the graft polymers C).

The rubbers are present in the graft polymers C) in the form of at least partially cross-linked particles having an average particle size of from 0.1 to 3.0 μm, in particular from 0.2 to 0.6 μm. They are at least partially cross-linked, i.e. they have gel contents above 20% by weight, in particular above 50% by weight, most preferably from 73 to 98% by weight.

The graft polymers C) are prepared by radical graft copolymerisation of the monomer mixtures of C.1.1) and C.1.2) defined above in the presence of the rubbers C.2) which are to be grafted, and they are all known substances. Preferred methods for the preparation of the graft polymers C) are emulsion, solution, solvent-free and suspension polymerisation. The so-called ABS polymers are particularly preferred graft polymers C).

Phosphoric acid esters of phenols, bisphenols and/or polyphenols used as components D) according to the invention correspond to Formulae (V) to (VIII):

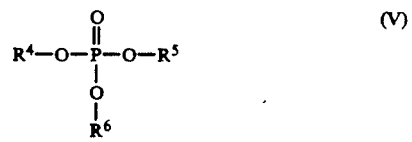

wherein $R^4$, $R^5$ and $R^6$ may be identical or different and denote $C_1$-$C_{20}$-hydrocarbon groups, at least two of the groups $R^4$, $R^5$ and $R^6$ being substituted or unsubstituted aryl groups (see DE-OS 3 429 481 and DE-OS 3 430 234). Methyl, ethyl and n- and isopropyl may be used as substituents.

Triphenyl phosphate, tricresyl phosphate, diphenyl-2-ethylphenyl phosphate and tri-(isopropylphenyl) phosphate are examples of phosphorus compounds corresponding to Formula (V).

Compounds corresponding to Formula VI

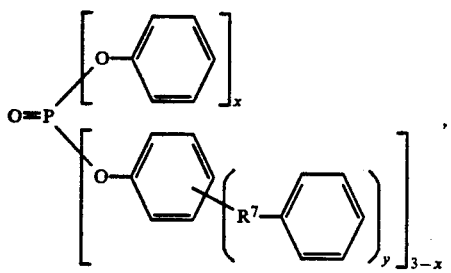

wherein
R⁷ denotes a direct bond or a CH₂,

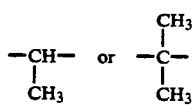

group,
x=0 or 1 or 2 when y=1 or
x=2 when y=2
and the aromatic groups may be substituted by $C_1$–$C_4$-alkyl (see U.S. Pat. No. 4,988,784) are also suitable phosphoric acid esters for the present invention.

The following are examples of phosphorus compounds corresponding to Formula (VI): Phosphoric acid bis-phenyl-(4-phenylphenyl) ester, phosphoric acid phenyl-bis-(4-phenylphenyl) ester, phosphoric acid tris-(4-phenylphenyl) ester, phosphoric acid bis-phenyl-(benzylphenyl) ester, phosphoric acid phenyl-bis-(benzylphenyl) ester, phosphoric acid tris-(benzylphenyl) ester, phosphoric acid bis-phenyl-(1-phenylethyl)-phenyl ester, phosphoric acid phenyl-bis-((1-phenylethyl)-phenyl) ester, phosphoric acid tris-((1-phenylethyl)-phenyl) ester, phosphoric acid bis-phenyl-((1-methyl-1-phenylethyl)-phenyl) ester, phosphoric acid phenyl-bis-((1-methyl-1-phenylethyl)-phenyl) ester, phosphoric acid tris-((1-methyl-1-phenylethyl)-phenyl) ester, phosphoric acid phenyl-bis-(4-(1-phenylethyl)-2,6-dimethylphenyl) ester, phosphoric acid bis-phenyl-2,4-di-benzyl-phenyl ester, phosphoric acid bis-phenyl-2,4-di-((1-phenylethyl)-phenyl) ester and phosphoric acid bis-phenyl-2,4-di-((1-methyl-1-phenylethyl)-phenyl ester.

The following are especially preferred: Phosphoric acid phenyl-bis-(4-phenylphenyl) ester, phosphoric acid bis-phenyl-((1-phenylethyl)-phenyl) ester, phosphoric acid phenyl-bis-((1-phenylethyl)-phenyl) ester, phosphoric acid bis-phenyl-((1-methyl-1-phenylethyl)-phenyl) ester, phosphoric acid phenyl-bis-((1-methyl-1-phenylethyl)phenyl) ester, phosphoric acid tris-((1-methyl-1-phenyl)ethyl) ester, phosphoric acid phenyl-bis-(benzylphenyl) ester and phosphoric acid bis-phenyl-2,4-di-(1-methyl-1-phenyl-ethyl)-phenyl ester and mixtures thereof.

Phosphoric acid esters suitable for the purpose of this invention also include those corresponding to Formulae VIIa and VIIb:

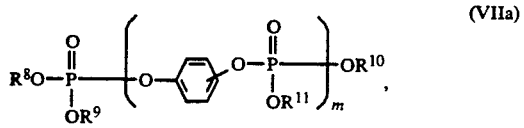

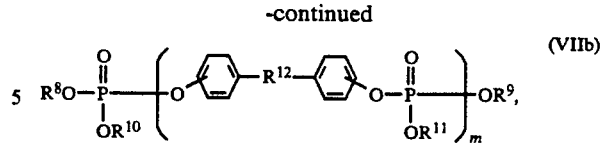

wherein
$R^8$, $R^9$, $R^{10}$ and $R^{11}$ may be identical or different aryl groups substituted with $C_1$–$C_4$-alkyl or aralkyl groups, such as phenyl-$C_1$–$C_6$-alkyl, $R^{12}$ denotes a single carbon/carbon bond, O, S, SO₂, CO, CH₂, C(CH₃)₂ or a carbon atom to which the biradical cyclohexyl or 3,3,5-trimethyl-cyclohexyl groups are attached, and m stands for integers having values from 0 to 10.

Examples of phosphorus compounds corresponding to Formulae VIIa and VIIb include phosphoric acid esters of 1,4-dihydroxybenzene (hydroquinone), 1,3-dihydroxybenzene (resorcinol), 4,4'-dihydroxydiphenyl, bis-(4-hydroxyphenyl)-methane (bisphenol F), 2,2-bis-(4-hydroxyphenyl)propane (bisphenol A), 1,1-bis-(4-hydroxyphenyl)-cyclohexane and 1,1-bis-(4-hydroxyphenyl)-3,3,5-trimethylcyclohexane.

Phosphoric acid esters according to the invention also include those corresponding to Formula (VIII):

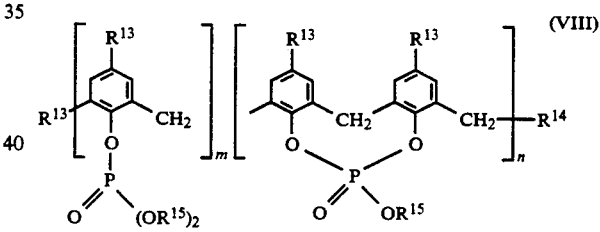

wherein
$R^{13}$ denotes hydrogen or an alkyl having 1 to 8 carbon atoms, preferably methyl,
$R^{14}$ stands for

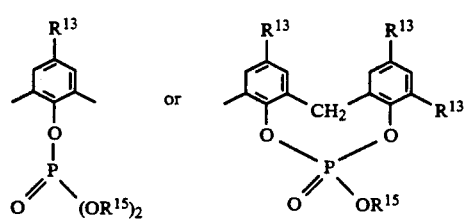

$R^{15}$ denotes phenyl which may be substituted by an alkyl having 1 to 4 carbon atoms, an aryl such as phenyl and/or an aralkyl such as benzyl or 2-phenylethyl, and when m equals zero then n must be at least equal to 1 and
$R^{14}$ must stand for the formula

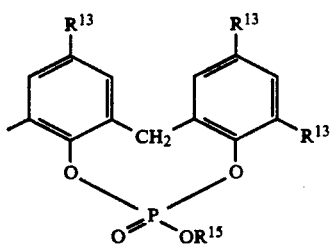

and when n equals zero then m must be at least equal to 2 and
$R^{14}$ must stand for

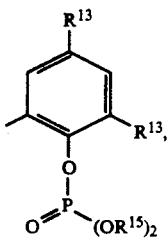

and m stands for an integer from zero to 12 and n stands for an integer from zero to 5, and the number of nuclei in the polyphenol molecule, i.e. the number of benzene rings in compound (VIII), must be not higher than 12, not counting the groups $R^{13}$ to $R^{15}$.

The phosphoric acid esters of Novolaks are examples of phosphoric acid esters corresponding to Formula (VIII). Suitable Novolaks include the condensation products of formaldehyde and phenols corresponding to the general Formula (IX)

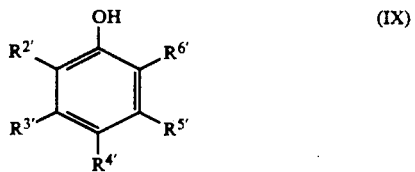

weherein $R^{2'}$ and $R^{6'}$ denote hydrogen atoms and $R^{3'}$, $R^{4'}$ and $R^{5'}$ may selectively be hydrogen, halogen or $C_1$–$C_{20}$-alkyl, $C_4$–$C_7$-cycloalkyl or $C_6$–$C_{10}$-aryl groups such as phenyl or naphthyl or $R^{2'}$ and $R^{4'}$ denote hydrogen atoms and $R^{3'}$, $R^{5'}$ and $R^{6'}$ may be the same as the above-mentioned groups.

The following are characteristic examples of phenols which, however, do not constitute limitations: Phenol, o-cresol, m-cresol, p-cresol, 2,5-dimethyl-, 3,5-dimethyl-, 2,3,5-trimethyl-, 3,4,5-trimethyl-, p-t-butyl-, p-n-octyl-, p-stearyl-, p-phenyl-, p-(1-phenylethyl)-, 1-phenylethyl-, o-isopropyl-, p-isopropyl- and m-isopropylphenol and numerous other phenols.

The following are preferably used: Phenol, o-cresol, m-cresol, p-cresol, p-t-butylphenol, o-t-butylphenol and p-octylphenol.

Mixtures of these phenols may also be used.

The following are therefore preferred Novolaks, without constituting limitations:
Phenol/formaldehyde Novolak,
o-cresol/formaldehyde Novolak,
m-cresol/formaldehyde Novolak,
p-cresol/formaldehyde Novolak,
t-butylphenol/formaldehyde Novolak, and
o-octylphenol/formaldehyde Novolak.

p-Cresol/formaldehyde Novolak is particularly preferred.

To prepare the esters, Novolaks are reacted with triarylesters of phosphoric acid by the so-called transesterification process and mixtures of Novolaks and phenols are reacted with phosphorus oxychloride by the so-called acid chloride process. Triphenylphosphate is preferably used in the transesterification process. Aryl and aralkyl phenols such as 4-phenylphenol, benzyl phenol, 1-phenylethylphenol, 1-methyl-1-phenylethylphenol and 2,4-di-(phenylethyl)-phenol may be used as additional phenols in both processes.

It is found as a special feature of the phosphoric acid esters of Novolaks that due to the multivalency of phosphoric acid as well as of the Novolaks, both open chain and cyclic structures may occur, depending on whether one valency or two valencies of a molecule have reacted together. Cross-linking reactions due to the multivalency of the reactants normally do not occur.

Examples of phosphorus compounds of Formula (VIII) suitable for this invention include the reaction products of 1 mol of triphenylphosphate or phosphoric acid trichloride with 1 or 2 equivalents of Novolak. The quantitative proportion of Novolak may also be between 1 and 2 equivalents. The third valency of the phosphoric acid is attached to phenol or a substituted phenol, as described above.

Phosphorus compounds of Formula (VIII) suitable for this invention may generally be prepared by known processes (for Novolaks see: Houben-Weyl, Methoden der organischen Chemie, Volume XIV/2, pages 193 to 292 and Ullmanns Encyclopädie der technischen Chemie, 4th Edition, Volume 18, pages 245 to 257; for phosphates, see, for example, Ullmanns Encyclopädie der technischen Chemie, 4th Edition, Volume 18, pages 389 to 391, 1979, and Houben-Weyl, Methoden der organischen Chemie, Volume 12/1, pages 299 to 374).

Mixtures of the phosphorus compounds of Formulae (V) to (VIII) may also be used.

The thermoplastic moulding compounds according to the invention may also contain other thermoplasts, such as polysulphones, polyether sulphones, polyketones, polyether ketones, polyphenylene ethers and polyarylene sulphides and other additives such as stabilizers, pigments, flow improvers, mould release agents, antistatic agents and/or metal compounds and halogen compounds as additional flame protective additives and other anti-dripping agents, such as polytetrafluoroethylene polymers and/or silicone rubbers and salts of sulphonic acids.

The present invention thus also relates to polycarbonate moulding compounds containing Components A), C), D), E) and optionally B), thermoplastic polysulphones, thermoplastic polyether sulphones, thermoplastic polyketones, thermoplastic polyether ketones, thermoplastic polyphenylene ethers and/or thermoplastic polyarylene sulphides, stabilizers, pigments, fillers, reinforcing agents, flow improvers, mould release agents, antistatic agents and/or metal compounds and halogen compounds as other flame-protective agents and additional anti-dripping agents and salts of sulphonic acids.

The thermoplastic moulding compounds according to the invention containing Components A), C), D), E) and optionally B), thermoplastic polysulphones, thermoplastic polyether sulphones, thermoplastic polyketones, thermoplastic polyether ketones, thermoplastic polyphenylene ethers and/or thermoplastic polyarylene sulphides as well as stabilizers, pigments, flow improvers, mould release agents, antistatic agents and/or metal compounds and halogen compounds as other flame protective agents as well as other anti-dripping agents and salts of sulphonic acids are prepared by mixing the components in known manner and melt compounding or melt extruding them at temperatures of from 200° to 330° C. in conventional apparatus such as internal kneaders, extruders or double shaft screws or by mixing the solutions of the above-mentioned components in suitable organic solvents, e.g. in chlorobenzene, and concentrating the solution mixtures by evaporation in conventional apparatus such as evaporation extruders.

The individual components may be mixed either successively or simultaneously in known manner, either at about 20° C. (room temperature) or at an elevated temperature.

The present invention thus also relates to a process for the preparation of thermoplastic polycarbonate moulding compounds containing Components A), C), D), E) and optionally B), polysulphones, polyether sulphones, polyketones, polyether ketones, polyphenylene ethers and/or polyarylene sulphides and stabilizers, pigments, flow improvers, mould release agents, antistatic agents and/or metal compounds and halogen compounds as other flame-protective agents and additional anti-dripping agents and salts of sulphonic acids, characterised in that the above components are mixed in known manner and then melt compounded or melt extruded in conventional apparatus at temperatures of from 200° C. to 330° C. or in that the solutions of the above-mentioned components in suitable organic solvents are mixed and the solvent mixtures are then concentrated by evaporation in suitable apparatus.

The moulding compounds according to the present invention may be used for the production of moulded products of all types. In particular they may be used for the production of moulded articles by injection moulding. Examples of moulded products which can be produced include housing parts of all types, covering plates for the building industry and parts for the motor vehicle industry. They are also used in the electrotechnical field as they have excellent electrical properties.

Particle sizes always denote average particle diameters $d_{50}$ determined by ultracentrifuge measurements according to W. Scholtan et al, Kolloid-Z. u. Z. Polymere 250 (1972) 782 to 796.

EXAMPLES

A. Components Used

I. Aromatic polycarbonate of 100% by weight of bisphenol A having a relative viscosity, detemined in methylene chloride at 25° C., of 1.284 (0.5% by weight solution).

II. Thermoplastic polymer of styrene and acrylonitrile having an acrylonitrile content of 29% by weight and an average molecular weight of 60,000.

III. ABS graft polymer of 50% by weight of a styrene/acrylonitrile mixture (in the ratio of 72:28) on 50% by weight of particulate polybutadiene having an average particle diameter ($d_{50}$) of 0.4 μm obtained by emulsion polymerisation.

IV. The polymer according to III containing 10% by weight of polytetrafluoroethylene, prepared by mixing the ABS graft polymer as a latex and the polytetrafluoroethylene as a dispersion and then coagulating and working up the components together as a coprecipitate.

V. Aramide fibres (Kevlar ® 29 of Dupont de Nemours, USA).

VI. Triphenyl phosphate.

VII. Mixture of phosphoric acid bis-phenyl-2,4-di-((1-phenylethyl)-phenyl) ester and phosphoric acid phenyl-bis-((1-phenylethyl)-phenyl) ester (see Example 2 of DE-OS 39 40 927).

VIII. Phosphoric acid ester of 2 mol of triphenylphosphate and mol of 4,4,-dihydroxydiphenylmethane (bisphenol F) by transesterification.

Preparation 2284.0 g (7.0 mol) of Triphenylphosphate, 707.7 g (7 gram equivalents) of 4,4'-dihydroxydiphenylmethane (bisphenyl F) (OH number 555) and 20.0 g (0.18 mol) of magnesium chloride are melted and then heated to 200° C. for 0.5 hours under a vacuum of 300 mbar in a 6-liter flask equipped with adjustable mushroom heating head, capillary and short Vigreux column with descending condenser. The stream of nitrogen introduced through the capillary ensures thorough mixing. 661.2 g of product (OH number 590) are then distilled off (7 mol of phenol: 658.7 g) in 4 hours via the column and condenser under a vacuum decreasing from 300 to 3 mbar at temperatures from 200° to 210° C. The product is then heated for one hour at 230° C. under a vacuum of 3 mbar.

After cooling, the reaction product is taken up in 5 liters of methylene chloride and washed free from chloride with water. After the methylene chloride solution has been dried over sodium sulphate, it is filtered and concentrated by evaporation. The yield is 2296.0 g=98.7% of the theoretical yield. The product is resinous. The phosphorus content is 9.2% (theoretical 9.3%) and the OH number is 0.

IX. Phosphoric acid ester of 1 mol of triphenylphosphate and 1 equivalent of Novolak (from p-cresol, number of nuclei about 5) by transesterification.

Preparation 1,142.0 g (3.5 mol) of Triphenylphosphate, 839.3 g (7 gram equivalents) of a Novolak of p-cresol and formaldehyde (OH number 468, number of nuclei about 5) and 10.0 g of magnesium chloride (0.09 mol) are melted and then heated for 0.5 hours at 200° C. under a vacuum of 300 mbar in a 4-liter flask equipped with adjustable mushroom heating head, capillary and short Vigreux column with descending condenser. The stream of nitrogen introduced through the capillary ensures thorough mixing. 681.7 g of product (OH number 550) are then distilled off (7 mol of phenol: 658.7 g) in 4 hours through the column and condenser under a vacuum decreasing from 300 to 3 mbar and at temperatures from 200° to 210° C. The product is then heated for one hour at 210° C. under a vacuum of 3 mbar.

After cooling, the reaction product is taken up in 4 liters of methylene chloride and washed free from chloride with water. After the methylene chloride solution has been dehydrated with sodium sulphate it is filtered and concentrated by evaporation. The yield is 1304.7 g=98.6% of the theoretical yield. Softening begins at 141° C. on the Kofler heating bench, the phosphorus content is 8.2% (theoretical 8.2%) and the OH number is 0.

Preparation and Testing of the Moulding Compounds, Results

The required components are mixed in a Banbury internal kneader (Pomini-Farrel company), Model BR (1.2 l) or Model OOC (3 l) at 230° to 240° C. in the quantities shown in Table 1 (given in parts by weight) and worked up into a granulate.

TABLE 1

| | Component A (Polycarbonate) | Component B (Copolymer) | Component C (ABS graft polymer) | ABS Graft polymer and polytetra-fluoroethylene | Component E aramide | | Component D phosphoric acid ester | | |
|---|---|---|---|---|---|---|---|---|---|
| Component | I. | II. | III. | IV. | V. | VI. | VII. | VIII. | IX. |
| Comparison 1 | 70.0 | 6.0 | 11.0 | | | 13.0 | | | |
| Comparison 2 | 70.0 | 6.0 | 7.0 | 4.0 | | 13.0 | | | |
| Example 1 | 70.0 | 5.5 | 11.0 | | 0.5 | 13.0 | | | |
| Example 2 | 70.0 | 2.5 | 11.0 | | 0.5 | | 16.0 | | |
| Example 3 | 70.0 | 2.5 | 11.0 | | 0.5 | | | 16.0 | |
| Example 4 | 70.0 | 2.5 | 11.0 | | 0.5 | | | | 16.0 |

The moulding compounds are extruded at 260° C. to form test samples (Apparatus: Werner Pfleiderer screw DKS 275, locking pressure 275 MP, screw diameter 56 mm, length L/D-23/1) and subjected to the following tests and assessments:

Impact strength according to DIN 43 543 ($a_n$),
heat distortion temperature according to DIN 53 460 (Vicat B)
Fire test according to the regulations of Underwriter Laboratories (UL 94),
Assessment of dripping,
Assessment of deformation on exposure to flame.
Table 2 shows the test data obtained.

TABLE 2

| | Test data | | | | | |
|---|---|---|---|---|---|---|
| | $a_n$ | Vicat B | | UL 94 Thickness of rod: | | Deformation on |
| | kJ/m² | °C. | Dripping | 2 mm | 3 mm | exposure to flame |
| Comparison 1 | n.b. | 90 | yes | V-2 | V-2 | no |
| Comparison 2 | n.b. | 90 | no | V-0 | V-0 | yes |
| Example 1 | n.b. | 93 | no | V-1 | V-0 | no |
| Example 2 | n.b. | 91 | no | V-1 | V-1 | no |
| Example 3 | n.b. | 94 | no | V-1 | V-0 | no |
| Example 4 | n.b. | 130 | no | — | V-1 | no |

*n.b. = not broken

Tables 1 and 2 show that the moulding compounds according to the invention (Examples 1 to 4) containing an aromatic polyamide according to the invention as anti-dripping agent and phosphates of phenols, bisphenol and Novolak do not drip under the test for fire characteristics and the assessments according to UL94 are V-1 and V-O for test samples 2 mm and 3 mm in thickness, respectively, i.e. the samples have good fire characteristics and undergo virtually no deformation on exposure to fire. By contrast, the comparison examples either have distinctly poorer fire characteristics (Comparison 1 drips and has a UL94 assessment of V2) or undergo deformation on exposure to fire.

We claim:

1. Thermoplastic polycarbonate moulding compounds containing
    A) from 40 to 90 parts by weight of a thermoplastic aromatic polycarbonate,
    B) from 0 to 80 parts by weight of a copolymer or polycondensate comprising
        B.1) from 0 to 50 parts by weight of a thermoplastic copolymer of from 50 to 95% by weight of styrene, α-methylstyrene, styrene alkylated in the nucleus, halogenated styrene or mixtures thereof and from 5 to 50% by weight of acrylonitrile, methacrylonitrile, alkyl acrylate, alkyl methacrylate, maleic acid anhydride, N-substituted maleiimide, vinyl acetate or mixtures thereof and/or
        B.2) from 0 to 80 parts by weight of a thermoplastic polyalkylene terephthalate,
    C) from 1 to 25 parts by weight of a graft polymer prepared from
        C.1) 5 to 90 parts by weight of a mixture of:
            C.1.1) from 50 to 95% by weight of styrene, α-methylstyrene, halogenated styrene, styrene alkylated in the nucleus, methyl methacrylate or mixtures thereof and
            C.1.2) from 5 to 50% by weight of (meth)acrylonitrile, methylmethacrylate, maleic acid anhydride, N-substituted maleiimide or mixtures thereof on
        C.2) from 10 to 95 parts by weight of a rubber having a glass temperature TG of $\leq 10°$ C.,
    D) from 1 to 30 parts by weight of phosphoric acid esters of phenols, bisphenols and/or polyphenols, and
    E) from 0.05 to 5 parts by weight of anti-dripping agents,
in which the total weight of A+B+C+D+E should add up to 100 parts by weight, characterised in that they contain, as anti-dripping agents E), aromatic polyamides or polyimidamides (aramides) in the form of fibres or powders or deposited on carriers.

2. Moulding compounds according to claim 1, characterised in that the aromatic polyamides/polyimidamides contain more than 50% by weight of aromatic starting components.

3. Moulding compounds according to claim 1, characterised in that the aromatic polyamide/polyimidamides contain more than 85% by weight of aromatic starting components.

4. Moulding compounds according to claim characterised in that the aromatic polyamide/polyimidamides are used as aramide fibres which are optionally ground.

5. Moulding compounds according to claim 1, characterised in that the aromatic polyamide/polyimidamides are used as powders as obtained from the synthesis of aromatic polyamide/polyimidamides by the interface process.

6. Moulding compounds according to claim characterised in that the aromatic polyamide/polyimidamides are used in the form of deposits on surfaces of carriers.

7. Moulding compounds according to claim 1, characterised in that the aromatic polyamide/polyimidamides are used in a flame protective combination together with aromatic esters of phosphoric acid.

8. Moulding compounds according to claim 1, characterised in that the aromatic esters of phosphoric acid used correspond to Formulae (V) to (VIII)

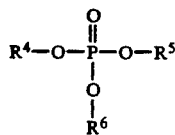
(V)

wherein $R^4$, $R^5$ and $R^6$ are identical or different and stand for $C_1$-$C_{20}$ hydrocarbon groups and at least two of the groups $R^4$, $R^5$ and $R^6$ are substituted or unsubstituted aryl groups;

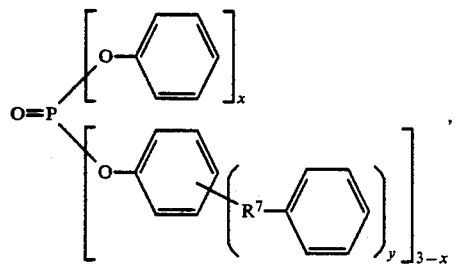
(VI)

wherein
$R^7$ denotes a direct bond or a $CH_2$,

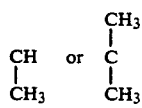

group,
x is equal to 0 or 1 or 2 when y equals 1 or
x equals 2 when y equals 2
and the aromatic groups may also be substituted by $C_1$-$C_4$-alkyl;

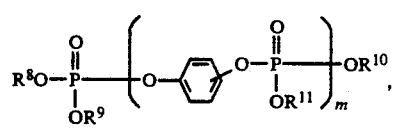
(VIIa)

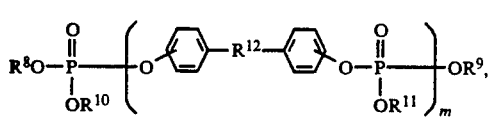
(VIIb)

wherein $R^8$, $R^9$, $R^{10}$ and $R^{11}$ are identical or different aryl groups substituted with $C_1$-$C_4$-alkyl or aryl groups,
$R^{12}$ denotes a single carbon/carbon bond, O, S, $SO_2$, CO, $CH_2$ or $C(CH_3)_2$ or a carbon atom to which the biradical cyclohexyl or 3,3,5-trimethylcyclohexyl groups are attached and
m denotes integers from 0 to 10;

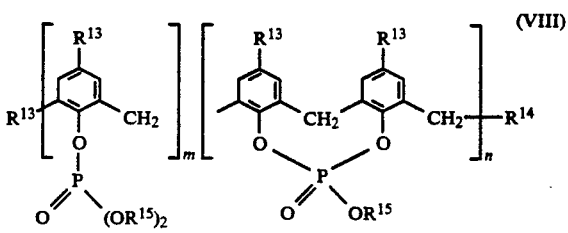
(VIII)

wherein
$R^{13}$ denotes hydrogen or alkyl having 1 to 8 carbon atoms,
$R^{14}$ denotes

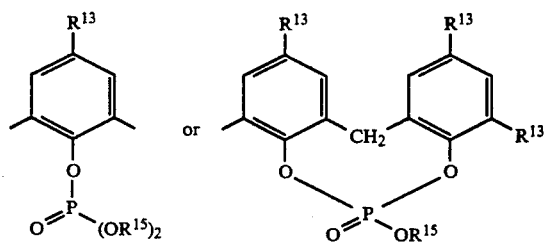

$R^{15}$ denotes phenyl which may be substituted by alkyl having 1 to 4 carbon atoms, by aryl and/or by aralkyl,
wherein, when m equals 0, n must be at least 1 and $R^{14}$ must be

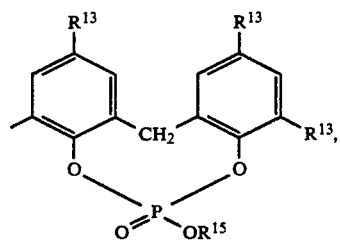

and when n equals 0, m must be at least 2 and $R^{14}$ must be

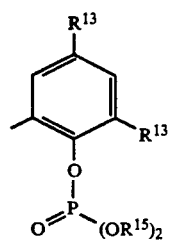

and wherein m denotes an integer from 0 to 12 and n denotes an integer from 0 to 5, and the number of nuclei of the polyphenol molecule, i.e. the number of benzene rings of Compound (VIII) without the groups $R^{13}$ to $R^{15}$, is not higher than 12.

9. Moulding compounds according to claim 1, in addition containing thermoplastic polysulphones, thermoplastic polyether sulphones, thermoplastic polyketones, thermoplastic polyether ketones, thermoplastic polyphenylene ethers and/or thermoplastic polyarylene sulphides, stabilizers, pigments, flow improvers, mould release agents, antistatic agents and/or metal compounds and halogen compounds as other flame retardants, or other anti-dripping agents and salts of sulphonic acids.

10. A process for the preparation of the polycarbonate moulding compounds of claim 1, characterised in that Components A), C), D), E) and optionally B), thermoplastic polysulphones, thermoplastic polyether sulphones, thermoplastic polyketones, thermoplastic polyether ketones, thermoplastic polyphenylene ethers and/or thermoplastic polyarylene sulphides, stabilizers, pigments, fillers, reinforcing agents, flow improvers, mould release agents, antistatic agents and/or metal compounds and halogen compounds as other flame retardants or other antidripping agents and salts of sulphonic acids are mixed together in known manner and melt compounded or melt extruded at temperatures from 200° C. to 330° C. in conventional apparatus or in that the solutions of the given components mentioned above in suitable organic solvents are mixed together and the solution mixtures are concentrated by evaporation in conventional apparatus.

11. A method of using the thermoplastic moulding compounds according to claim 1 wherein said thermoplastic moulding compounds are subjected to moulding conditions so as to form moulded articles.

12. Moulding compounds according to claim 7, wherein said aromatic esters of phosphoric acid are selected from the group consisting of phenyl esters, bisphenol esters and Novolak esters.

13. Moulding compounds according to claim 8, wherein $R^{13}$ is methyl.

14. Moulding compounds according to claim 8, wherein $R^{15}$ denotes phenyl which is substituted by a phenyl group.

15. Moulding compounds according to claim 8, wherein $R^{15}$ denotes phenyl which is substituted by an aralkyl group selected from the group consisting of a benzyl group or a 2-phenyl-ethyl group.

* * * * *

UNITED STATES PATENT AND TRADEMARK OFFICE
CERTIFICATE OF CORRECTION

PATENT NO.  : 5,272,193
DATED       : December 21, 1993
INVENTOR(S) : FUHR ET AL.

It is certified that error appears in the above-indentified patent and that said Letters Patent is hereby corrected as shown below:

Column 16, line 66, claim 4, "claim" should read --claim 1,--.

Column 17, line 6, claim 6, "claim" should read --claim 1,--.

Signed and Sealed this

Twelfth Day of July, 1994

Attest:

BRUCE LEHMAN

*Attesting Officer*     *Commissioner of Patents and Trademarks*